United States Patent [19]

Denniston

[11] Patent Number: 4,889,546

[45] Date of Patent: Dec. 26, 1989

[54] METHOD AND APPARATUS FOR FORMING FIBERS FROM THERMOPLASTIC MATERIALS

[76] Inventor: Donald W. Denniston, 4412 S.W. 85th Way, Gainesville, Fla. 32608

[21] Appl. No.: 350,933

[22] Filed: May 12, 1989

Related U.S. Application Data

[63] Continuation-in-part of Ser. No. 198,399, May 25, 1988, Pat. No. 4,861,362.

[51] Int. Cl.$^4$ .................. C03B 37/06; C03B 37/04
[52] U.S. Cl. ................................... 65/5; 65/6; 65/9; 65/12; 65/14; 65/16; 264/8; 264/12; 425/7; 425/8
[58] Field of Search .................... 65/5, 4.4, 6, 9, 12, 65/14, 16; 264/8, 12; 425/7, 8

[56] References Cited

U.S. PATENT DOCUMENTS

| | | | |
|---|---|---|---|
| 2,925,620 | 2/1960 | Karlovitz et al. | 65/5 |
| 2,982,991 | 5/1961 | Karlovitz | 65/16 X |
| 3,020,585 | 2/1962 | Berthon et al. | 65/9 X |
| 3,357,808 | 12/1967 | Eberle | 65/16 X |
| 3,372,011 | 3/1968 | Porter | 65/14 |
| 3,442,633 | 5/1969 | Perry | 65/5 |
| 3,746,524 | 7/1973 | Kirchheim | 65/14 X |
| 3,787,195 | 1/1974 | Kirchheim | 65/16 X |
| 4,194,897 | 3/1980 | Levecque et al. | 65/5 |
| 4,268,293 | 5/1981 | Levecque et al. | 65/5 |
| 4,414,010 | 11/1983 | Chin et al. | 65/16 |

Primary Examiner—Robert L. Lindsay

[57] ABSTRACT

Method and apparatus for attenuating glass fibers. Primary glass is delivered into a primary, high temperature, high velocity gaseous blast to produce fibers that are attenuated while carried by said primary blast. While the fibers are above the minimum glass attenuation temperature, the fiber containing primary blast is subjected to thin, closely spaced, high speed jets that deliver fuel and oxidant at a higher speed and less rate of mass flow than said primary blast essentially normal to the primary blast to increase the attenuation of the fibers and the temperature of the primary blast at one or more stations spaced downstream from the location where primary glass is delivered to one side only of said primary blast. The side of jet application may be the same or differ from one said station to another said station. Shields may be provided in spaced relation on opposite sides of the primary blast and closely offset from the opposing rows to limit the amount of atmospheric air that is entrained into the primary blast. Means is provided in heat exchanging relation with the shields to control the temperature of the surfaces of the shields so that fibers carried by the primary blast that engage the shields are prevented from sticking to the shields without lowering the temperature of the main body of the fibers to below the minimum temperature required for attenuation.

20 Claims, 4 Drawing Sheets

METHOD AND APPARATUS FOR FORMING FIBERS FROM THERMOPLASTIC MATERIALS

RELATION TO OTHER APPLICATIONS

This application is a continuation-in-part of U.S. patent application Ser. No. 198,399 of Donald W. Denniston, filed May 25, 1988 now U.S. Pat. No. 4,861,362 granted Aug. 29,1989 for Method and Apparatus for Forming Fibers from Thermoplastic Materials.

BACKGROUND OF THE INVENTION

This invention relates to producing fine fibers from thermoplastic material, such as but not limited to glass. More specifically this invention involves improvement in the production of fine fibers by modifying conventional flame blown and/or rotary processes and/or apparatus for producing fine fibers.

The conventional "flame blown" process comprises drawing molten glass from a furnace and continuously cooling said molten glass to form one or more rods or "primary fibers" generally having diameters in the range on the order of 0.010 to 0.035 inch. These primary fibers are continuously fed side by side into a high temperature high velocity blast of gas that extends sidewise with limited height to form a wide blast that intercepts the primary fibers. The high temperature high velocity blast softens the glass rods and the force of the blast attenuates or elongates the softened material into fibers.

The production efficiency of this fiberizing process is dependent on how fast the primary blast of hot gas can soften the primary fibers and how long a time the primary fibers can be stretched or attenuated.

Typically, primary fibers are aligned on approximately 0.060 inch centers and fed into the primary gas blasts at approximately 0.40 pounds per hour per primary fiber. These primary fibers can be attenuated to an average fiber diameter of about 0.00015 inch.

With production rates conventional in the prior art and knowing the density of the glass, one can calculate that the attenuating ability of the blast is approximately 5800 feet per second. The attenuation rate, in this example 5800 feet per second, is the heart of the prior art process and governs the production rate (pounds per hour) and the economics of the operation.

In the remainder of this discussion, the rate of attenuation will be called Specific Attenuation Rate (SAR) and is by definition the mathematical length of a round fiber whose volume is equal to the volume per second that is softened from each primary fiber.

Mathematically, this can be expressed as:

$$SAR \text{ (feet/second)} = \frac{M}{D^2} \times 32.647 \times 10^{-5}$$

where
 M=pounds/hour/primary fiber fed to the primary blast
 D=average diameter of the final fiber (inches)
 $32.647 \times 10^{-5}$=constant adjusting for units and glass density, etc.

In the "flame blown" process, batch material or marbles are melted in a furnace and directed to a forehearth above the fiber forming equipment. In the floor of the forehearth containing the molten glass are several "bushings" that are positioned in a line. Each "bushing" is a device generally fabricated of a platinum-rhodium alloy with several series of holes or tips through which the molten glass flows. The molten glass flows through these tips at a rate governed by the hole size, length of tip, head of glass over the tip, and viscosity of the glass at the time it is flowing through the tip. This glass then cools by radiation and convection and by its own weight will be drawn into a round rod called a primary fiber. The diameter of these primary fibers is controlled by the glass composition, bushing temperature and a force applied by cot rolls which exert a uniform rate of downward pulling. These primary fibers are for example pulled in a line on approximately 0.060 inch centers and directed into a high velocity high temperature flame. This flame is blasted at nominally but not necessarily right angles to the line of primary fibers.

In order to produce the high velocity flame blast, an unburned combustion mixture is fed along a feeder pipe to a burner. Combustion takes place in a combustion chamber within the burner. The latter has an elongated horizontally extending slot opening. The high temperature products of combustion leave the burner in the form of a blast along a primary axis at a high velocity, in general 400 to 800 feet per second and at a temperature on the order of 3000 degrees Fahrenheit or higher. This high temperature, high velocity blast (typically ¼ to ¾ inch vertically by 4 to 16 inches horizontally) is directed along a primary axis that intersects the primary fibers which are being forced in a downward direction into the blast. The primary fibers are heated due to the blast and when the fibers soften, the force of the blast bends the primary fiber and begins to lengthen them to form attenuated fibers. The softened primary fibers continue to soften as they get hotter and the force of the blast tends to pull them away from the point of bending along the primary axis. If the fibers are pulled in a straight line and at the speed of the blast, one would be producing fibers at a Specific Attenuation Rate (SAR) of 400 to 800 feet per second depending on the speed of the blast.

SAR rates of 5800 feet per second are not at all uncommon in actual operation. The reason for the increased attenuation over the blast velocity can be explained by turbulence.

Turbulent motion is characterized by a random motion of particles constituting the fluid stream and in general makes its appearance in fluids when they flow past solid surfaces or when neighboring streams of the same fluid flow past one another. Irregularity or randomness of the fluctuations is essential for turbulent motion. A fluid in turbulent motion may be thought to possess an average velocity in the (x) direction along a primary axis with a superimposed random motion resulting in instantaneous deviations from the average velocity at any point. Thus, a fine dust particle in the stream would be seen to describe an irregular zigzag motion in all directions, while being carried downstream along the direction of the primary blast at an average velocity. The instantaneous fluctuating velocity at any point has components in x, y, and z directions. The root mean square value of these fluctuating velocities is referred to as the intensity of turbulence.

There are two other concepts of turbulent motion that should be briefly mentioned in line with the intensity of turbulence. These are defined by scales ($l_1$) and ($l_2$). The scale of turbulence ($l_1$) is analogous to the mean kinetic free path of molecules that is associated with Brownian movement. Grossly simplified, that would be the average path length the zigzagging particle mentioned above would travel before changing direction. Another scale ($l_2$) is based on the observation of the fluctuating velocity in the (x) direction at two points in the stream separated by a distance (y) in the (y) direction. If the points are very close together the observations will be identical, that is they will show perfect correlation of the flow, and if sufficiently far apart no correlation will be found. By definition the scale ($l_2$) may be regarded as proportional to the average size of an eddy. There is no theoretical relation known between ($l_1$) and ($l_2$)

In the conventional "flame blown" process the primary fibers are first softened by the temperature of the blast and then attenuated by the high velocity of the hot blasts arranged in a horizontal row. The attenuation in each blast is augmented by the turbulence in the blast. As the hot blast entrains surrounding air, the turbulence is increased somewhat due to the mixing, and the temperature is lowered, also due to the mixing with the colder surrounding gases (in general, air). The fiber will be continuously attenuated as long as it remains at a sufficiently high temperature (or low viscosity) so that the turbulent energy of the hot gases can attenuate or stretch each small section of fiber.

With this reasoning, one can see why the SAR can be greater when the end product is desired to be a very fine fiber—say 0.00003 inch diameter versus a 0.00015 inch diameter fiber. Less energy and smaller scales of turbulence are needed to further attenuate finer fibers that would be insufficient to attenuate larger cross-sectional fibers.

In general, attenuation takes place when the ratio of viscosity to surface tension is between 5 and 50. If this ratio is much below 5, the surface tension force is strong enough to form a sphere creating what is referred to as "shot" instead of a fiber. When the ratio exceeds a value in the neighborhood of 50, the viscosity is so great the turbulent blast is unable to stretch or attenuate the fiber additionally.

In the conventional rotary process where molten glass is fed through a rotating apertured wall by centrifugal force and the resulting fibers are engaged with high speed, high temperature blasts from an encircling ring burner, the SAR values are roughly equal to or lower than what has been obtained with the flame blown process. The major economic advantages of the various rotary processes are two-fold:

1. molten glass is attenuated directly into fibers, eliminating the energy needed to reheat the primary fibers; and, 2. many more streams of molten glass can be assembled into a given space than is possible with the flame blown system which produces primary fibers along one or more rows at a spacing of 0.060 inch.

As mentioned earlier, the flame blown process can only handle one linear row of primary fibers into the blast on approximately 0.060 inch centers (approximately 200 fiberizing sources or primary fibers per linear foot).

In contrast to this, the rotary process can develop primary fibers from 3000 to 50,000 holes in a single spinner of 12 inch diameter. This would be approximately 1000 to 15,000 fiberizing sources per linear foot. However, the SAR is in general considerably less than in the flame blown process. At best it is equal to the flame blown process in SAR.

When U.S. Pat. No. 4,861,362 was filed, the state of the art was limited to production of fine fibers of a maximum SAR of about 30,000 feet/second.

The following table puts this in focus and shows what could be done to increase the rate of fiber production with the present invention if the present invention could develop higher SAR values without introducing problems that existed in the prior art.

TABLE I

| Fiber Diameter Inches | Fiber Diameter Microns | SAR | Pounds Per Hour Per Primary Fiber |
|---|---|---|---|
| 0.00015 | 3.81 | 5,800 | .40 |
| 0.00003 | .762 | 15,000 | .041 |
| 0.0005 | 1.27 | 30,000 | .23 |
| .00004 | 1.00 | 30,000 | .145 |
| 0.00003 | .762 | 30,000 | .083 |
| .00002 | .508 | 30,000 | .037 |
| .00001 | .254 | 30,000 | .009 |
| .00001 | .254 | 40,000 | .012 |
| .00001 | .254 | 100,000 | .030 |
| .00001 | .254 | 200,000 | .061 |
| .00001 | .254 | 300,000 | .092 |

One can see that to make a given diameter fiber the production rate is directly proportional to the SAR. There is a market for fibers of 0.25 microns if they can be produced at a lower cost. Currently, 1.27 micron fibers sell for about $3.00 per pound at production rates of approximately 0.23 pounds per hour per primary fiber and 0.25 micron fibers can be produced at 0.009 pounds per hour or approximately 4% the production rate of the 1.27 micron fibers. Such slow production makes the selling price of the finer fiber prohibitive at 30,000 SAR, the limit of current technology.

Prior to my inventions, the maximum SAR that could be developed with the "flame blown" or the rotary process was limited to approximately 30,000 feet per second. The preceding table shows that the production rate to produce fibers having a diameter of 0.25 microns was limited to 0.009 pounds per hour per primary fiber. With modifications to the flame blown apparatus, SARs have been developed in the range of 100,000 to 300,000 feet per second. This means that it is possible to produce attenuated glass fibers of 0.25 microns diameter at a rate of feed of 0.092 pounds per hour per primary fiber using prior art flame blown apparatus incorporating an enclosed duct having a suddenly enlarged downstream portion and walls heated to a temperature within the glass attenuation range. However, attenuated glass fibers stick to hot duct walls and production has to stop to clean the ducts too frequently to develop an economical operation because the time needed to clean the ducts is nonproductive. Also, the ratio of length to diameter of the thinner attenuated fibers, particularly those of submicron diameter developed at higher SAR values, is too small to fabricate fiber glass insulation pads of acceptable flexibility and tensile strength. The ratio of length to diameter of submicron fibers should preferably exceed about 200 for ultrafiltration uses. This ratio should preferably exceed about 2,000 for thermal insulation purposes where fibers coarser than one micron diameter are involved.

The prior art recognized the limitations of a fiber forming system that included a single attenuation means and developed systems with auxiliary glass attenuation means. Despite many attempts to be described in connection with a discussion of patents of interest that follows, prior art patented systems provided with auxiliary attenuation means failed to solve the aforesaid problems.

PATENTS OF INTEREST

U.S. Pat. No. 2,925,620 to Karlovitz and U.S. Pat. No. 2,982,991 to Karlovitz et al. both disclose a flame blown system using a primary blast of high temperature, high velocity gas to deflect and attenuate primary fibers and cause the latter to move along a primary axis along an enclosed duct with erratic components of movement both transversely and longitudinally of the primary axis. The cross-section of the enclosed duct is enlarged suddenly in the direction of the primary blast to promote additional turbulence of said blast. The turbulence is characterized by recirculating eddies and increased attenuation of the fibers.

These patents teach one to maintain the duct at an elevated temperature in the glass attenuation temperature range, either by electrical heat or by applying hot gaseous blasts through the duct walls at an angle to the primary blast. Consequently, some turbulent fibers strike and stick to the heated walls of the enlarged duct portion. Periodically, it becomes necessary to stop operations to remove adhered fibers from the walls of the duct. Karlovitz does not mention the application of hot gaseous blasts in a direction essentially normal to the primary blast to augment turbulence of the latter. Also, the extremely high turbulence that develops in a totally enclosed duct of enlarged cross-section results in the production of fine fibers so short compared to their diameter that mats formed from such short fine fibers do not have sufficient resiliency or tensile strength required for acceptable insulation mats.

U.S. Pat. No. 3,020,585 to Berthon, et al., and U.S. Pat. Nos. 3,746,524 and 3,787,195 to Kirchheim all relate to the rotary process and all direct flows of fluid to previously attenuated fibers to either accelerate the downward rate of movement of already attenuated fibers toward a fiber collector and/or to control the shape of the resulting mass of fibers before collecting a mat of the fibers. Berthon blows jets set at angles up to 70 degrees with respect to the axis of the centrifuge. The Kirchheim patents show shaping members comprising co-extensive plates or a series of spaced, partially overlapping elements between which air induction takes place in the general direction of fiber movement toward a fiber collector.

U.S. Pat. No. 3,372,011 to Porter applies attenuating gas blasts to fibers having a mean diameter of 6 to 12 microns in a direction essentially parallel to the direction of fiber flow. The maximum SAR that can be obtained from the data in the Porter patent is about 9,000 feet per second.

U.S. Pat. No. 4,194,879 to Levecque et al. and U.S. Pat. No. 4,268,293 to Levecque et al. introduce streams of molten glass into a primary or main gas blast by applying secondary carrier jets at a small acute angle to the molten glass streams to drive the streams into the primary or main gas blast and develop alternating clockwise and counter-clockwise tornados by the interactions of the carrier jets with the main blast around adjacent streams of molten glass to develop a fiber from each stream. Each fiber, at least part of the time, has nearly helicoidal movement at an increasing amplitude and velocity that results in a continuous attenuation process. The Levecque process has been given the name "toration" and was patented as an improvement over the then prior art techniques of attenuating fiber glass, such as longitudinal blowing, aerocor and centrifuging processes enumerated and described in the aforesaid patents to Levecque et al. The Levecque et al. inventions accomplish attenuation in a short path length on the order of one to two centimeters. The final place of attenuation takes place within a short length of glass flow from the tip of a cone of each said tornado and extends for only about three to five jet secondary orifices.

U.S. Pat. No. 4,414,010 to Chin, et al. entrains additional air in an extension of a duct in the direction of movement of a primary blast to create turbulence of glass fibers at the expense of the force of the primary blast in an attenuation zone of a pivotable enclosed duct extension.

BRIEF DESCRIPTION OF THIS INVENTION

This invention relates to method and apparatus for producing highly attenuated glass fibers of sufficient length to diameter ratio to be suitable for forming insulation pads or filters having acceptable quality. The apparatus of this invention is capable of continuous operation for a relatively long period compared to the Karlovitz apparatus without clogging and requiring scraping of glass fibers from duct walls.

This invention also differs from the inventive subject matter of the Levecque et al. patents by applying high velocity jets against one side only of the primary of main gas blast at a station spaced downstream of the point where molten glass is first delivered into said primary or main gas blast a distance significantly greater than the one to two centimeters within which the Levecque et al. attenuation is accomplished. Thus, the present invention relates to an entirely different method and apparatus from those of the Levecque et al. patents. The present invention increases the SAR to a value considerably greater than the maximum obtainable from use of the toration technique patented by Levecque et al. regardless of how the glass streams are introduced into the primary or main gas blast. In fact, the present invention may be used in combination with any of the prior art techniques of introducing primary glass into a primary gas blast described in the Levecque et al. patents, or with the Levecque et al. toration process.

In the invention described and claimed in parent U.S. Pat. No. 4,861,362, primary glass is first delivered into a primary, high temperature, high velocity gaseous blast to produce fibers that are attenuated while carried by said primary blast. While the fibers are partially attenuated and still above the minimum glass attenuation temperature, the fiber containing primary blast is then subjected to opposing rows of thin, closely spaced, high speed jets that deliver fuel and oxidant at a higher speed and less rate of mass flow than said primary blast to said fibers carried by said primary blast in directions essentially normal to the primary blast to increase the attenuation of the fibers and the temperature of the primary blast at one or more locations spaced downstream from the location where primary glass is first delivered to said primary blast.

This invention differs from that of parent U.S. Pat. No. 4,861,362 by limiting the origin of the application of said thin, closely spaced, high speed jets to one side only of the primary gas blast at any jet application station. The one side from which the thin jets are applied may be located on either side of the primary blast in the present invention. The thin jets are applied to one or the other side of the primary gas blast in spaced relation to the point of introduction of primary glass into the primary blast that is at least two inches downstream therefrom and preferably, at least six inches downstream from said point of introduction. The thin jets are applied from tubes located along one or more spaced lines of tubes extending transversely of the direction of flow of the primary gas blast. If any additional spaced lines of tubes are present, they are spaced downstream from the first line of said tubes. All of the lines of tubes may be located to one side only of the primary blast or downstream spaced lines of tubes may be located on alternate sides of said primary blast in spaced relation to one another along the path of the primary blast.

Furthermore, as in the invention described and claimed in U.S. Pat. No. 4,861,362, shields may be provided in spaced relation on opposite sides of the primary blast and closely offset from the opposing rows to limit the amount of atmospheric air that is entrained into the primary blast. Means is provided in heat exchanging relation with the shields to control the temperature of the surfaces of the shields so that fibers carried by the primary blast that engage the shields are prevented from sticking to the shields without lowering the temperature of the main body of the fibers to below the minimum temperature required for attenuation.

DESCRIPTION OF PREFERRED EMBODIMENTS

Figure 1:
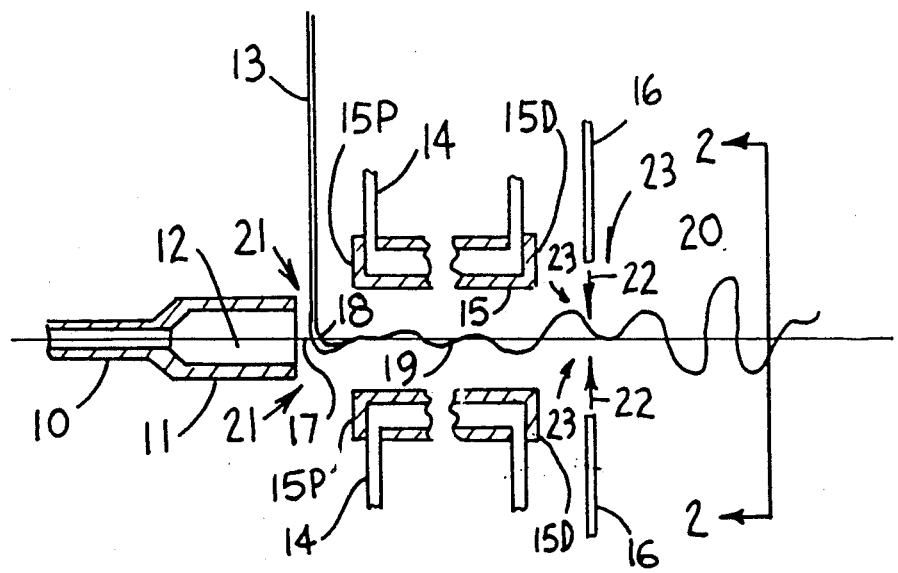
FIG. 1 is a schematic cross-sectional view of apparatus capable of performing this invention in a flame blown process using a pair of cooled shields flanking a primary blast followed by a bank of opposed sets of thin, closely spaced, hollow nozzles through only one of which extremely thin high velocity jets blow into the primary blast.
Figure 2:
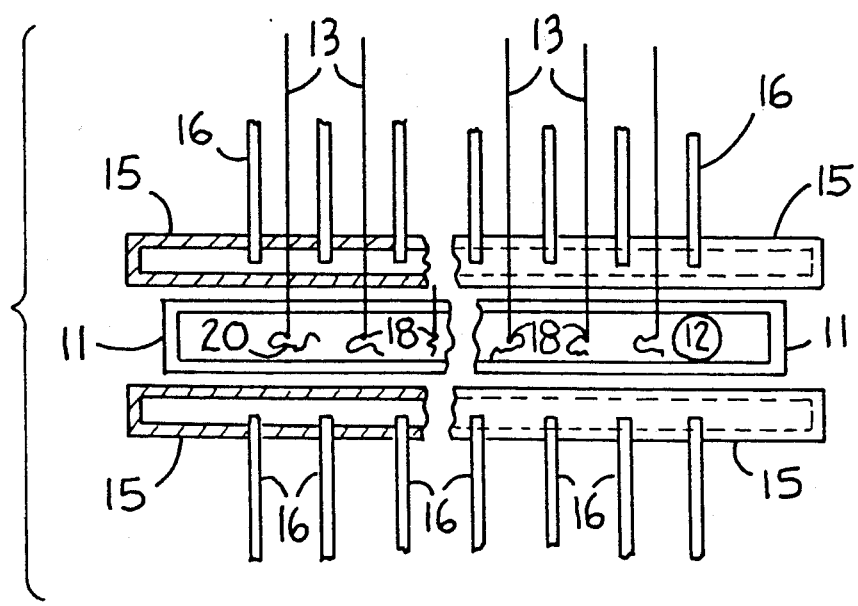
FIG. 2 is a fragmentary schematic sectional view taken at right angles to the view of FIG. 1 looking upstream from a plane downstream of the bank of opposed sets of thin hollow nozzles.

Referring to the drawings, and, particularly, FIGS. 1 and 2, a simple embodiment of this invention is shown for a flame blown system. A feed pipe 10 is connected to a burner 11 having a combustion chamber 12 to supply combustion gases at a high velocity, preferably 400 to 800 feet per second, at an elevated temperature in the glass attenuation range, preferably 3000 to 3400 degrees Fahrenheit, to move a resulting primary flame blast 17 to the right as seen in FIG. 1 along a primary axis, shown extending in a horizontal direction.

A pair of cooled shields 15, preferably made of stainless steel, are mounted in co-extensive relation to one another above and below primary flame 17 to define a narrow, open sided, open ended volume 1 to 2 inches high, preferably 1.25 to 1.75 inches high, and 6 to 18 inches long, extending from a plane intersecting the proximal ends 15P of shields 15 to a plane intersecting the distal ends 15D of shields 15 and approximately 72 to 90 inches wide. Preferably, burner 11 is one of a series of burners having openings 15 inches wide and ¼ to ¾ (preferably 5/8) inch high lying side by side with 3 inch spacings between openings to provide the burners 11 at 18 inch centers. Bushings (not shown) are aligned above the burners 11 to form a row of openings above a space one to two inches long (measured along the direction of movement of high velocity blast 17) that separates the exit of the aligned burners 11 from the plane intersecting the proximal ends 15P of the shields 15. Each of the bushings is the source of one of a series of aligned primary fibers 13 that are fed from the bushings into the high velocity, high temperature, primary gaseous blast within the aforesaid space. These primary fibers 13 are force fed downward into the high temperature high velocity blast 17, where the heat of the blast softens the primary fibers and the high velocity bends the primary fibers 13 at a point 18 to move in the general direction of primary blast 17 and the primary fibers 13 start to elongate in the direction of the primary blast 17 into fine fibers 19.

Shields 15 are provided to limit the mixing of the primary blast from burner 11 with the surrounding atmosphere and to minimize loss of temperature and velocity of the primary blast at desired high levels as the blast moves between shields 15. Some surrounding atmosphere is entrained in space 21 above and below burner 11 and upstream of proximal end 15P.

The surfaces of shields 15 that face one another are kept cool by heat exchange means 14 that includes supply and exhaust ducts that communicate with a chamber formed behind each shield 15. The opposing surfaces of shields 15 need to be cool enough to avoid having molten, partly attenuated glass fibers (that are carried by primary blast 17) from sticking to the opposing surfaces of shields 15 when the fibers strike the latter during their turbulent motion through the open sided chamber defined by the aligned shields 15. However, the facing surfaces of shields 15 must not be so cold as to provide heat sinks sufficient to cool the main body of the attenuating fibers as the latter are propelled by primary blast 17 through the open sided chamber defined between aligned shields 15 to a temperature below the glass attenuation temperature.

According to the preferred embodiment of the method aspect of this invention, the temperature and flow rate of the fluid applied to moderate the surface temperature is so correlated with the thermal conductivity of shields 15, the heat capacity of the cooling fluid and the heat capacity of the primary blast of hot fluid that the cooling effect from the fluid circulated behind shields 15 is effectively limited to the surface of the shields and its immediate vicinity and decays rapidly with increasing distance from the opposing shield surfaces.

The temperature of the primary blast and that of the main body of attenuating fibers decrease somewhat along the length of the open-sided chamber from the proximal end 15P to the distal end 15D of shields 15 that define said open-sided chamber and the rate of flow of the primary blast decreases somewhat, but the cooling effect of the fluids applied to moderate the temperature of shields 15 is so limited that the primary blast and attenuating fibers in the main body of attenuating fibers 19 carried by the blast 17 remains above the minimum glass attenuation temperature at the downstream end of the open-sided chamber aligned with the distal ends 15D of shields 15. Sufficient cooling is obtained by cooling ¼ inch thick shields with water while 16 gauge thick shields can be air cooled.

Two rows of hollow tubes 16, one above the primary blast and the other below the primary blast, are provided in a bank of thin hollow tubes downstream of the distal ends 15D of shields 15 to provide an upper row of downwardly directed high velocity, fine jets 22 from upper row of hollow tubes 16 or a lower row of upwardly directed high velocity fine jets 22 from lower row of hollow tubes 16. The rows of hollow tubes lie in a common vertical plane that is preferably in the range of ½ inch to 1 inch downstream of the plane common to distal ends 15D.

The rows of hollow tubes 16 are used to direct the thin gas jets 22 at higher speeds than the primary blast velocity and at a lesser mass rate than said primary blast along paths that have at least a major component of flow normal to the primary axis 17 of the primary blast carrying the attenuating fibers to perform at least two functions that further attenuate the fibers with less fiber breakage than experienced with prior art auxiliary glass attenuation means. First, the jets are applied at a high velocity and produce additional combustion products at an elevated temperature range within the glass attenuation temperature range to provide sufficient additional thermal energy to maintain the fibers at a proper temperature range for an additional period of time to allow further attenuation of the fibers 19, and to provide additional mechanical energy by adding force normal to the moving attenuating fibers that is converted to turbulence that increases the intensity and scale of turbulence as the primary blast continues to carry the attenuating fibers into an area beyond a plane common to the upper and lower rows of hollow tubes 16 where the fibers are further attenuated into fine fibers 20.

These hollow tubes 16, preferably about 2 inches long, are positioned out of the flow pattern of the primary blast and have free ends separated from row to row a slightly greater distance than the separation between the distal ends 15D of shields 15, so that partially attenuated fibers do not come in contact with them. Preferably, the distance ranges from 2 inches to 4 inches between the free ends of hollow tubes 16.

The apparatus just described is described and claimed in parent U.S. Pat. No. 4,861,362 and is especially adapted for use in performing the method claimed in said parent application when high velocity auxiliary fluid jets are directed simultaneously through the upper and lower rows of hollow tubes toward the opposite sides of primary blast 17. In contrast, the method of this invention can be performed either by applying auxiliary high velocity fluid jets through the upper row of nozzles 16 with no fluid blown through the lower row or by applying auxiliary high velocity fluid with jets through the lower row of nozzles with no fluid blown through the upper row. The maximum resultant SAR after such use of said apparatus is more than the maximum of approximately 30,000 feet per second developed from toration, but is not quite as high as the apparatus of the parent application can develop when auxiliary high velocity fluid jets are simultaneously directed against both sides of primary blast 17. However, not every application of fiber glass requires an SAR of 300,000 feet per second. The requirement for attenuated fiber glass having intermediate SAR values can be met at lower expense than that required for auxiliary jets through both opposed rows of tubes 16 by applying the auxiliary fluid jets through delivery tubes located to either one side or the other side of primary blast 17. Another difference between this invention and that of the parent application results when the apparatus of parent U.S. Pat. No. 4,861,362 is modified by eliminating either the upper or lower row of tubes in each station having opposing rows of tubes 16. Either the upper or lower row of tubes may be omitted from any station, whichever happens to be convenient to omit at each jet applying station.

There are numerous ways jets applied through hollow tubes 16 can be used to accomplish the desired effect, i.e., increase the SAR, by increasing the time the fibers remain in an attenuable state and independently increasing the turbulence while the fibers are capable of being attenuated. The hollow tubes 16 are closely spaced throughout the length of each row of tubes and the rows extend across substantially the entire width of primary blast 17 to assure substantial attenuation of fibers across the width of primary blast 17.

The present invention contemplates different modes for using hollow tubes 16. In one embodiment, hollow tubes 16 are arranged to provide jets 22 on 0.060 inch centers (same spacing as the primary fibers 13). The individual hollow tubes are constructed to have an inner diameter of approximately 0.010 inch and an outer diameter of approximately 0.020 inch. The hollow tubes 16 are on the order of 2 inches long and connected to separate headers (not shown) for each row.

A gaseous fuel such as natural gas or propane is fed through the hollow tubes 16 at 15 to 30 pounds per square inch header pressure. Fine gas jets 22 blasted through hollow tubes 16 penetrate the primary blast, creating additional turbulence in several ways. First of all, the fine jet 22 from each hollow tube 16 forces the main blast to change its path to go around a portion of each fine jet. In addition, the kinetic energy of the jets is converted to turbulence as their velocity in the vertical direction is reduced to zero and takes on a reduced velocity in the horizontal direction of primary blast 17. This requires on the order of 60% of the gas used in the main blast applied at a velocity of 400 feet per second through a burner opening ⅝ inch by 15 inches. This gas entrains additional air 23 from the atmosphere adjacent hollow tubes 16 and burns, creating additional flame generated turbulence as well as increasing the volume of turbulent gases at glass attenuating temperatures.

In a second embodiment, a gaseous fuel such as natural gas or propane is mixed with an oxidant such as air and the mixture is fed through the hollow tubes at 15 to 30 pounds per square inch header pressure. The mixture is kept below the explosive limit, for example five parts air to one part fuel by volume. The effect is similar to the previous embodiment, only it reduces additional fuel required from 60% to 12%.

In a third embodiment, air supply tubes 16 having inner diameters of 0.020 inch and outer diameters of 0.030 inch are alternated with the supply tubes previously described. The air supply tubes from each row are connected to a separate manifold using air at 10 to 30 pounds per square inch in pressure. That is, the tubes in the row alternately supply fine gas jets 22 through smaller diameter tubes of 0.010 inch inner diameter and fine air jets through larger diameter tubes of 0.020 inch inner diameter. This provides about 50% of the required air or oxidant for combustion. The remainder of the air needed for complete combustion is entrained by the jets. The total kinetic energy added by the air and gas jets 22 is about 75% of that of the main attenuating blast.

If the main burner has a ⅜ inch high slot, the free ends of the hollow tubes 16 are preferably approximately one to two inches from primary blast 17 that extends essentially horizontally from the burner center line and the high velocity jets 22 from tubes 16 penetrate a significant distance into the thickness of the blast.

The tubes 16 are shown to be at right angles to the main blast. They could be angled obliquely toward or away from the burner to some extent, preferably not exceeding about 15 degrees from normal, and still fill the two-fold function of increasing the time the fiber is in an attenuable state and increasing the level of turbulence as long as the hollow tubes 16 extend in a direction that has a major component normal to primary blast 17 and the minor component parallel to primary blast 17 is relatively small.

The hollow tubes 16 do not have to have the diameters described previously, nor do they have to be on approximately 0.060 inch centers. The reason for preferring 0.060 inch centers is that is the spacing of the primary fibers. The advantage of using the same spacing is to get more uniform turbulence throughout the main jet so that all primary fibers will see essentially the same conditions.

The shields 15 are shown with glass fiber facing surfaces parallel to the main blast. This does not mean they cannot be divergent in the direction of primary axis 17. However, any divergence should be limited so that the vertical space between distal ends 15D is less than the space between upper and lower hollow tubes 16.

Figure 3:
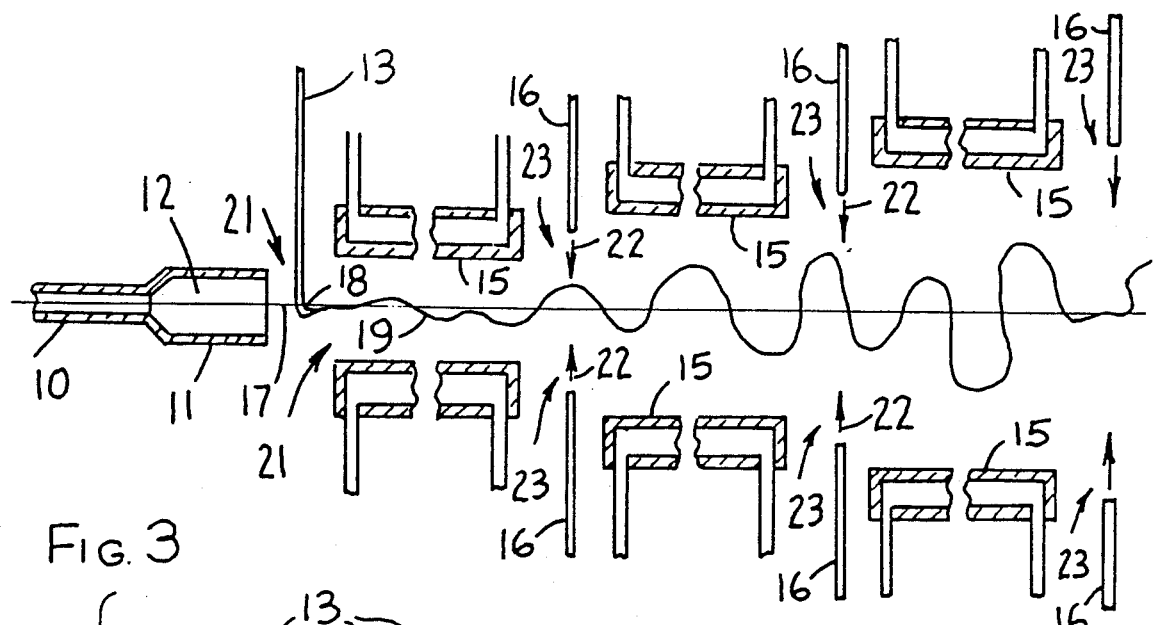
FIG. 3 is a schematic view similar to that of FIG. 1 showing an alternate embodiment of this invention using alternate pairs of cooled shields and banks of opposed thin hollow nozzles.
Figure 5:
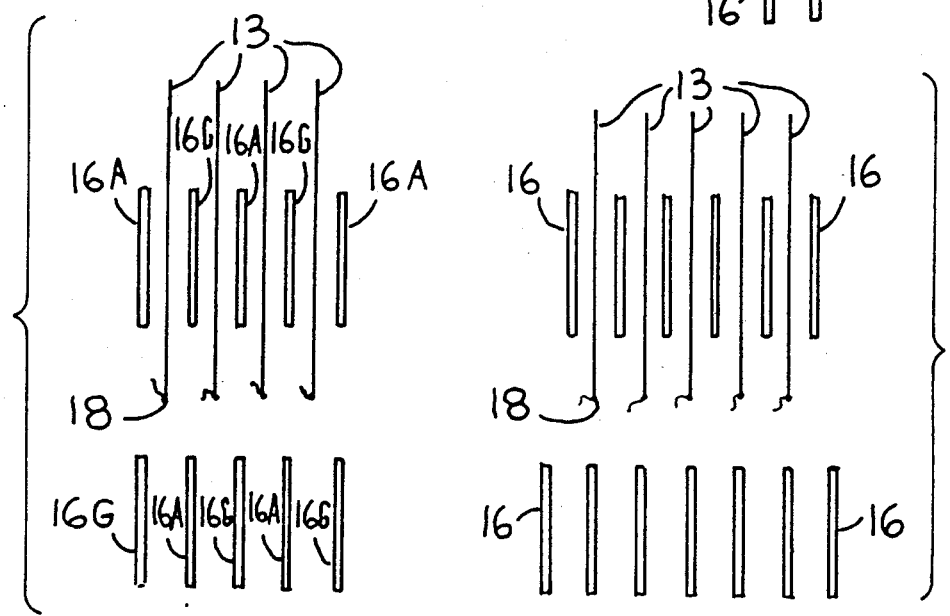
FIGS. 5, 6, and 7 are schematic views showing different arrangements of the flows of gas and oxidant through the banks of thin, closely spaced, hollow nozzles.
Figure 6:
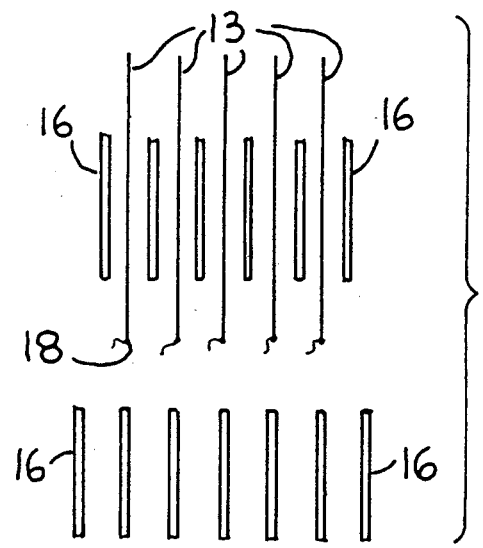
Figure 7:
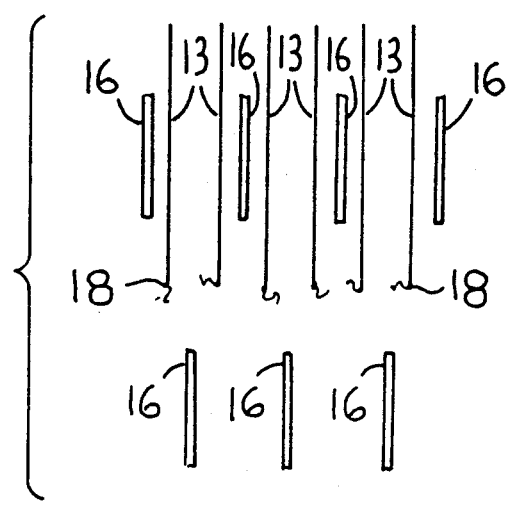

In an alternate embodiment of the embodiment of FIGS. 1 and 2, the combination of opposed shields 15 and downstream hollow tubes 16 is repeated with increased separation between successive opposed shields as shown in FIG. 3. The expanded cross section along the system is sized to contain the added volume of gases supplied by jets 22 from hollow tubes 16 plus the entrained air. The expansion is not so large as to cause recirculation, and added turbulence is provided by the jets of gas and air or mixtures thereof that penetrate the primary blast in directions that have major components normal to the primary blast. As the primary blast passes between more widely separated shields and passes by hollow tubes, the temperature and force of the main blast reduces. Thus, the temperature and the force of the jets may vary from set to set along the length of the FIG. 3 embodiment.

The hollow tubes could supply hot gases (air or products of combustion) under pressure in an oblique direction, preferably not exceeding 15 degrees from normal toward the main blast. The limiting temperature factor is the material used for the hollow tubes (approximately 1600 degrees Fahrenheit for stainless steel). Ceramic tubes are too fragile in the thin dimensions required. The kinetic energy of the hot gases is not as great as the cold gases but it increases the time and turbulence in the primary blast.

The primary blast from a burner 11 would be depleted in about two feet of length because the glass fibers encountered are below the glass attenuation temperature at that location in the absence of strengthening due to the fine blasts 22 from the hollow tubes 16. Hence, apparatus with a single pair of spaced shields 15 should be limited to 18 inches in the direction of the primary blast and the FIG. 3 embodiment should preferably contain three pairs of shields 15, each six to twelve inches long separated approximately one inch to two inches from pair to pair with a row of tubes disposed in each resulting space.

The FIG. 3 embodiment shows three pairs of opposed cooled shields 15 alternating with thin hollow tubes 16. The first pair of cooled shields 15 have their facing surfaces spaced about 1 and ¼ to 1 and ¾ inches apart followed by the first set of tubes 16, followed by successive increases of ¼ to ½ inch of thickness of space between opposed shields 15 and followed by additional thin tubes 16 along the path of movement of primary blast 17. The tubes 16 are spaced about ½ inch to one inch from adjacent shields 15 in the direction of primary blast 17.

In another embodiment, all tubes 16 may be fed a mixture of 5 to 10 parts air to each part gas. In some cases, additional air will be entrained and required for burning the gas in the jets as the jets penetrate the primary blast 17.

The first set of plates 15 are approximately one inch above and below the center line of primary blast 17 as shown on FIG. 3. The second set comprises plates positioned approximately 1 and ½ inches from the center line. The third set comprises plates positioned approximately 2 inches above and below the center line.

The jet supplying tubes 16 can be positioned 1 and ¼ inches away from the center line above or below. At 1000 feet per second velocity, the jets penetrate the main blast almost to the center line. Their kinetic energy in the vertical direction is partially converted to kinetic energy in the horizontal direction and lowers the kinetic energy of the main blast. The total reduction of kinetic energy in the system is converted to turbulence. This turbulence is high in intensity, but much of it is of small scale. Each jet of the 201 jets associated with 200 primary fibers 13 in the first bank causes a low pressure area on its down stream side relative to the main blast. This, in itself, creates turbulence that decays in roughly 80 to 100 diameters of the small jet. Additional turbulence is generated by the mixing of the fine, high speed jets 22 with the main blast 17 due to the different velocities and directions. Still additional turbulence results from the expansion of the fine, high speed jets as their temperature is increased due to the chemical reaction (combustion) and/or their being heated by the adjacent hot blast.

The plates 15 serve to somewhat confine the main blast vertically and restrict the amount of cooling air that is entrained at area 21 above and below the burner. The inside of the plates facing the main blast need to be maintained at a temperature below which the softened glass being attenuated will stick if they were to come in contact with the plate.

The plates could be stainless steel and cooled by a fluid, such as air or water, for example. The amount plates 15 are cooled is enough to balance the amount the primary blast and added jets heat these plates due to radiation and convection. The primary jet has a rather non-luminous flame and entrains air at area 21. Experimentation is needed for each apparatus to determine the cooling needed for its plates 15.

The second and third set of plates 15, if used, require more cooling in the downstream direction as the primary blast has been slowed down and expanded by the jets from tubes 16 as well as the entrained air.

EXAMPLE I

A typical operation using a burner provided with an opening ⅜ inch high and 15 inches wide developing complete combustion of natural gas at a volume ratio of ten standard cubic feet of air to one standard cubic foot of natural gas (or a mass ratio of 16 to 17 parts of air to each part of natural gas) developing a blast velocity of 600 feet per second and a blast temperature of 3200 degrees Fahrenheit leaving the burner consumes approximately 20,000 standard cubic feet per hour of completely combusted gas to provide a horizontal primary blast that intersects 200 primary glass fibers 13 at 0.060 inch centers. Alternate tubes 16 of 0.010 inch inner diameter supply natural gas jets and of 0.020 inch inner diameter supply air jets at a velocity of 1000 feet per second leaving each tube 16. The total mass of natural gas jets 22 is about 10 to 11 percent of the gas in the primary blast and additional air is entrained from the space between the distal end of plates 15 and the row of jets to develop the air needed to assure complete combustion of the added natural gas jets. The added jets of gas and air have a kinetic energy that is more than 12.5 percent of the kinetic energy from the primary blast.

In the embodiment of FIG. 3, the additional tubes 16 are also provided with jets of oxidant and fuel such as air and gas or air-gas mixtures at velocities faster than the primary blast velocity but a total added mass of fuel and oxidant through jets less than the mass of the main blast. Also, in the FIG. 3 embodiment, auxiliary jets are applied from one side or the other of primary blast 17 to inject said jets into one side only of primary blast 17 at the first station containing tubes to supply the auxiliary jets. At each consecutive station spaced downstream of one another along the axis of primary blast 17, the auxiliary jets may be applied to either the same side or to the opposite side of primary blast 17, whichever is more convenient. Thus, the present invention differs from that of parent U.S. Pat. No. 4,861,362 by avoiding the simultaneous application of opposed auxiliary jets provided in the parent patent.

Figure 4:
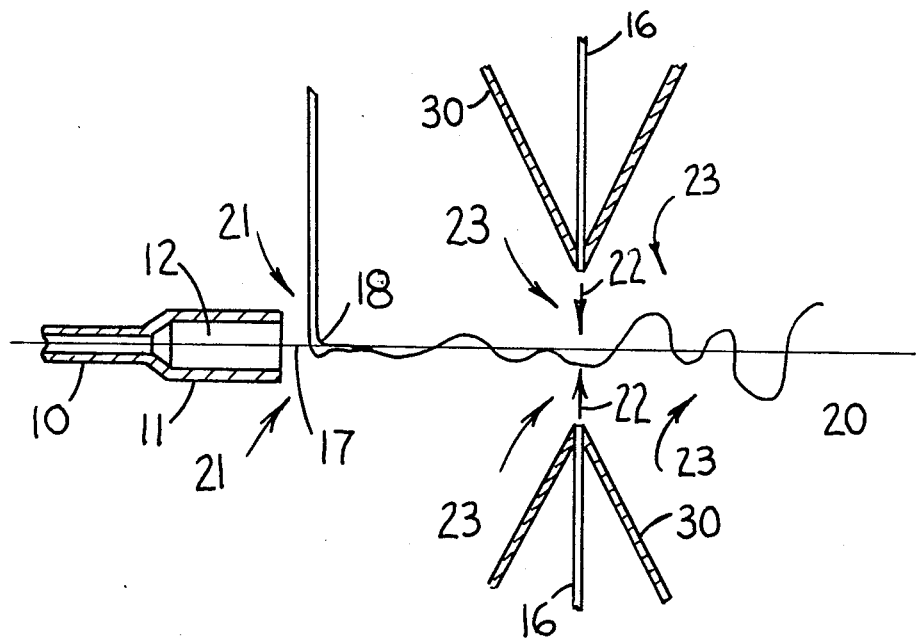
FIG. 4 is a schematic view of an embodiment of the present invention similar to FIG. 1 in which oblique plates flanking the pair of sets of thin, closely spaced, hollow nozzles are included and the shields of FIG. 1 omitted.

FIG. 4 shows a system where the essentially horizontal plates 15 of FIG. 1 are not used. This embodiment works to increase the SAR without plates 15. The small jets 22 lose their force fairly soon after leaving the tubes 16. Therefore the physical tube has to be fairly close to the main blast to be effective to penetrate and generate turbulence in the primary blast. Some way is needed to shield these tubes from coming in contact with the glass. It is possible the first row of tubes 16 approximately two to six inches downstream from the burner would not need any protection at all and still do the job.

In FIG. 4 as in previous figures, a high velocity combustion mixture is burned in chamber 12. The products of combustion are discharged through the opening in the end of the burner 11. These gases are at high temperature, 2800 to more than 3400 degrees Fahrenheit, and at high velocity, 400 to 800 feet per second or greater. Primary glass rods 13 (in the order of 0.010 to 0.035 inch in diameter) are fed vertically downward into the high temperature, high velocity primary blast 17. The primary glass rods are in a common plane and on about 0.060 inch centers. The primary glass fibers 13 are heated by the blast 17 and when softened are bent at 18 in the direction of the primary blast by the velocity of the primary blast. The softened primary fibers 13 continue to increase in temperature and, as they get less viscous, are stretched or attenuated by the velocity of the primary blast, both the average velocity and the turbulent velocity within the primary blast.

The high temperature, high velocity primary blast 17 entrains additional air 21 immediately after leaving the burner 11. The kinetic energy of the primary blast tends to spread or widen and entrain additional air as the primary blast moves away from the burner 11. This increases the intensity of turbulence and tends to reduce the primary blast temperature. The individual fibers are rapidly attenuated by this turbulence as long as the temperature is sufficiently high to keep the fiber in an attenuable state.

This embodiment of the present invention also provides means of increasing the intensity of turbulence and maintaining the fiber in an attenuable state for additional time which is similar to the means provided in the FIG. 1 and 3 embodiments. A row of tubes 16 is directed in a plane at right angles to the plane of the primary blast, and parallel to the horizontal face of the burner. These tubes are positioned on close centers approximately equal to or a multiple of the spacing of the primary fibers. One row of tubes 16 is above the primary blast. Through these tubes can be fed a high pressure in the order of 10 to 30 pounds per square inch combustible mixture of gas and oxidant such as air. The jets 22 leaving the tubes 16, due to kinetic energy, penetrate the blast, causing additional turbulence in the primary blast. In addition, the gases from these small jets are heated by the primary blast 17 to their ignition point and burn. This, in turn, causes a sizable increase in the volume of these gases which creates additional turbulence. At the same time, this burning of these additional jets increases the temperature of the primary blast. The increase in temperature is preferably sufficient to maintain the fibers in an attenuable state for additional time and the added turbulence causes further attenuation. Oblique shields 30 are provided in the FIG. 4 embodiment in flanking relation to tubes 16 to protect the tubes confining the jets of gas from coming in contact with fibers and to prevent these fibers from being entangled in said tubes, which entanglement in time will build up and cause a shutdown for cleaning. Some air flow 23 is entrained on the average, but turbulent eddies at times could come in contact with the shields 30. If fibers touched the shields, the fibers would not become entangled and would be blown off or fall off. Cooling means may be provided for shields 30 to produce the same result as provided for shields 15.

The net result is the fibers remain in an attenuable state for a longer time and at a greater distance from the burner and the degree of turbulence is increased over the prior art by the addition of the kinetic energy of the jets 22 which is largely converted to turbulence, by the flame generated turbulence, and by the addition of isotropic turbulence just downstream of points where the jets enter the blast.

The jets 22 must serve two functions:
1. add turbulent energy; and,
2. maintain the temperature of the turbulent volume of gases confining the fibers at an elevated temperature at which fibers can be attenuated by the turbulence in the blast.

Figure 8:
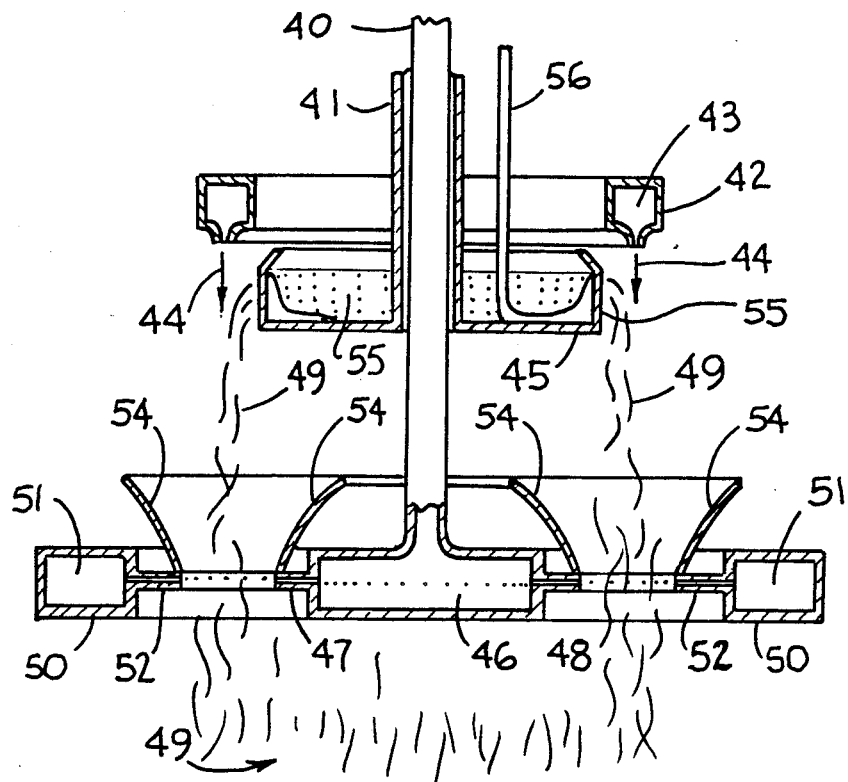
FIGS. 8 and 9 are schematic elevational views of embodiments of the present invention adapted for use with the rotary system.
Figure 9:
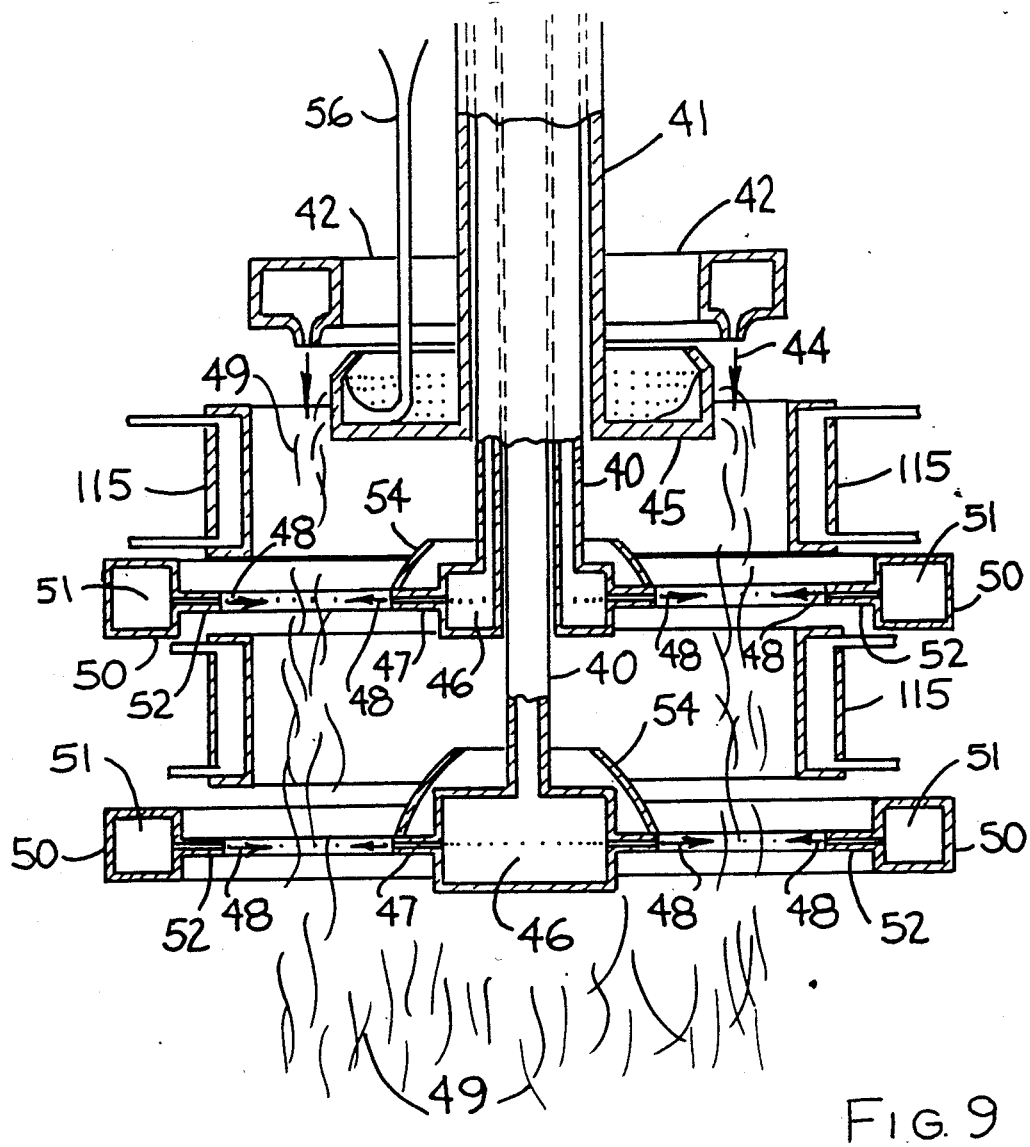

FIG. 8 shows the present invention used to increase the attenuation rate using the conventional rotary process with means for providing the added attenuation. FIG. 9 shows an alternate embodiment of using this invention to improve the operation of rotary process apparatus.

Typical rotary apparatus of FIG. 8 comprises a fixed tube 40 surrounded by a hollow shaft 41 that is rotated in the order of 3000 RPM. At the base of the shaft 41 is a spinner 45, in general about 12 inches in diameter. In an apertured vertical wall 55 that surrounds spinner 45 there are thousands of holes through which the molten glass flows by centrifugal force to form fine molten streams that are further attenuated and forced in a downward direction to form fibers 49 by a high temperature, high velocity blast 44 that results from mixing a gas and air in a chamber 42. Combustion takes place in a peripheral combustion chamber 43. This is the extent of the prior art attenuation (two steps—first centrifugal force attenuates the molten glass from the surface of the spinner 45 to the blast 44 and second, attenuation by the high temperature high velocity blast 44). The resulting fibers cool in the entrained air and are collected on a conveyor (not shown).

To increase the Specific Attenuation Rate by a factor of two to ten in parent U.S. Pat. No. 4,861,362, additional energy is added to the system by means of two opposed circles of tubes 47 and 52 aligned in radial direction nominally at right angles to the direction of the blast 44. Centrally of tubes 47 is a non rotating plenum chamber 46 for fluid fed through tube 40 at a pressure of 15 to 30 pounds per square inch. Small diameter tubes 47 having an inner diameter of 0.01 to 0.03 inch extend radially and horizontally outwardly from plenum chamber 46. These tubes 47 are spaced approximately 0.1 inch apart on the circumference of the plenum chamber 46. An outer ring or annulus 50 defines a plenum chamber 51 from which extend radially inwardly directed, thin horizontal tubes 52. Each tube 52 opposes a tube 47, or may be staggered in alternating circumferential positions. Fine jets 48 are emitted at high velocity through opposing tubes 47 and 52 in said parent U.S. Pat. No. 4,861,362. The material fed through the tubes 47 and 52 can be a combination of fuel and oxidant that will ignite when the jets 48 hit the hot blast 44 or they can be the hot products of combustion.

The parent invention can use the FIG. 8 embodiment by applying fine jets 48 through tubes 47 with no application through tubes 52 or through tubes 52 only with no application through tubes 47 to perform the method aspect of the present invention. The FIG. 8 embodiment of the parent patent U.S. Pat. No. 4,861,362 can also be modified to the apparatus aspect of the present invention by omitting or removing either tubes 47 or 52 from the FIG. 8 apparatus.

If there is no shielding of the tubes 47 and/or 52, there is a chance that due to the gross air currents, fibers will be entangled in the small tubing and require frequent cleaning. To avert this, shields 54 are added to direct the fiber laden blast 44 in a vertical cylindrical space defined between tubes 47 and 52. Shields 54 may be cooled according to the criteria explained for cooling shields 15 and 30.

A molten stream 56 of heated glass is fed into rotating spinner 45 for centrifugal outward spinning into the primary blast 44 directed in a cylindrical shape downwardly from peripheral combustion chamber 43 to form a hollow cylindrical volume of fibers 49 that moves downward propelled by the velocity of primary blast 44 to a level where gas-air jets 48 fed at a higher velocity from tubes 47 or 52 but having a total volume per unit time less than that of the primary blast 44 causes the gas-air jets 48 to penetrate primary blast 44 and cause further attenuation and additional maintenance of elevated temperature of the glass fibers carried by primary blast 44 in a manner similar to the manner by which added turbulent energy and temperature maintenance is provided in the embodiments of FIGS. 1 to 4, except that in the case of the rotary process, the primary blast 44 is vertical and the high speed, thin jets 48 are horizontal rather than the directions that exist in the flame blown process.

The FIG. 9 embodiment differs from the FIG. 8 embodiment in providing circular shields 115 vertically spaced from one another to surround the fibers 49 carried downward by primary blast 44 and providing additional opposed tubes 47 and 52 in the narrow spaces between shields 115. The inward facing surfaces of shields 115 are cooled from within for the same reason as shields 15 are cooled.

The FIG. 9 embodiment, like the FIG. 8 embodiment, can perform the method of this invention by applying auxiliary high speed fluid jets through only one of the first set of opposed tubes 47 or 52 and again through only one of the additional set of opposed tubes 47 or 52, whichever set is more convenient to supply with auxiliary fluid at each level where a set of opposing tubes 47 and 52 is located to face the path along which primary blast 44 carries fibers 49 past said level. As in the FIG. 3 embodiment, all the auxiliary high speed jets may be applied either from one side only of the primary blast to intercept one side only of the primary blast at stations spaced downstream of one another or may be applied from consecutive rows of tubes located downstream of one another on alternate sides of the primary blast. In addition, the apparatus of this invention can be modified by removing or omitting any one row of pipes from either side of the primary blast at any station containing tubes for applying auxiliary high speed fluid jets. However, it is preferred to retain or include the set or sets of opposed tubes 16 or 47 and 52 included in the apparatus of parent U.S. Pat. No. 4,861,362 so that the apparatus may be capable of performing the method of said parent application as well as that of this application, particularly when apparatus is already constructed with opposed rows of tubes.

Thus, rotary systems or flame blown systems may be provided with means for providing high speed, very narrow jets of heated combustion products or of fuel and oxidant that penetrate in opposite directions normal to the primary blast at consecutive jet applying stations spaced downstream of one another to face either alternate sides or the same side of primary blast 17 or 44 to increase attenuation and to introduce heat by oxidation and/or heated products of combustion that postpone the cooling of the glass fibers carried by the primary blast as in the embodiments of FIGS. 1 to 4.

In addition, means may be provided for rotary apparatus to cool the opposed surfaces of plates that define the opposite boundaries of the primary blast so that buildup of fiberglass on their surfaces may be avoided as is done for shields 15, 30 and 54.

It is understood that this invention may also be practiced using liquid fuel as well as gaseous fuel to produce the fine high velocity jets of this invention. Also, oxygen may be used as the oxidant as well as air.

This specification has met the requirements of the patent statutes for adequate disclosure of this invention by explaining the principle, preferred construction and mode of operation of this invention and by illustrating and describing what is now considered to be its best embodiments. It is understood, however, that, within the scope of the claimed subject matter that follows, the invention may be practiced otherwise than as specifically illustrated and described.

What is claimed is:

1. A method of attenuating glass fibers comprising producing a primary, high temperature, high velocity gaseous blast along a primary axis, introducing a plurality of primary glass fibers into said blast so that said glass moves with and is attenuated into fibers by said primary blast, delivering from a row of thin hollow tubes located to one side only of said primary blast a plurality of closely spaced, thin, high speed jets of fuel and oxidant at speeds sufficiently higher than the speed of said primary blast toward said primary blast to penetrate essentially normal to said primary blast at a minimum distance two inches downstream from the location where said primary glass fibers are introduced into said primary blast and wherein said primary blast is at an elevated temperature sufficient to attenuate said glass fibers, but at a total mass rate of flow of jets less than the mass rate of flow of said primary blast, whereby said impinging jets cause local increased turbulent flow of said fibers within said primary blast and said fuel oxidizes in said primary blast to maintain the temperature of said primary blast above a minimum temperature at which said glass attenuates.

2. A method as in claim 1, further including moving said primary blast carrying said glass fibers between a pair of opposing shields and cooling surfaces of said shields facing said primary blast at a rate sufficient to prevent fibers that engage said shield surfaces from sticking thereto but insufficient to cool the main body of said fibers carried by said primary blast to a temperature below that necessary for glass fiber attenuation.

3. A method as in claim 1, wherein said jets are emitted from a plurality of thin tubes aligned in rows that extend transversely of the primary blast and that are closely spaced relative to one another along each row.

4. A method as in claim 1, where said plurality of jets are essentially uniformly spaced along a plane essentially normal to said primary blast and said jets are delivered essentially normal to said primary blast in essentially uniform spacing between adjacent of said plurality of jets.

5. A method as in claim 1, wherein said thin jets comprise alternate jets of fuel and oxidant.

6. A method as in claim 1, where each of said thin jets consists essentially of a mixture of fuel and oxidant.

7. A method as in claim 1, comprising applying said thin jets to one side only of said primary blast at a plurality of jet applying stations, each of said stations being spaced downstream of an immediately preceding station, each of said stations having a unique bank of thin hollow tubes located on one side only of said primary blast to apply said jets therethrough to one side only of said primary blast at each of said stations.

8. A method as in claim 7, comprising applying said thin jets to the same side only of said primary blast at each of said stations.

9. A method as in claim 8, comprising applying said thin jets to the same or opposite side of said primary blast at adjacent of said stations.

10. A method as in claim 1, wherein said primary blast is supplied at an initial temperature of more than 2800 degrees Fahrenheit from an opening at least 4 inches wide and $\frac{1}{4}$ inches to $\frac{3}{4}$ inches high at a velocity between 400 and 800 feet per second and said jets are supplied from thin hollow tubes 0.060(n) inches apart where (n) is an integer from 1 to 2 along rows spaced at essentially equal spacings from row to primary blast and at a speed of at least 1000 feet per second, the total fuel and oxidant supplied through said bank of rows of thin hollow tubes being less than the total fuel and oxidant supplied to said primary blast, said tubes having diameters of 0.010 to 0.020 inch.

11. Apparatus for producing glass fibers comprising means for producing a primary, high temperature, high velocity gaseous blast along a primary axis, means for introducing a plurality of primary glass fibers into the blast so that the glass is attenuated into fibers by the heat and velocity of said primary blast as said glass fibers are carried by said primary blast, a bank of thin tubes spaced downstream of said glass introducing means, said bank comprising a transversely extending row of said thin tubes disposed on one side only of and extending essentially normal to said primary blast, means to deliver through said tubes a plurality of closely spaced, fine jets of fuel and/or oxidant, at least some of said jets comprising fuel, at speeds sufficiently higher than said primary blast speed essentially normal to said primary blast to penetrate into said primary blast at a distance at least two inches downstream from said introducing means where said primary blast is at a temperature at which said glass is attenuated and at a rate of mass flow less than the rate of mass flow of said primary blast so that said jets cause local increased turbulent flow within said primary blast and said fuel oxidizes in said primary blast to maintain the temperature of said primary blast above a minimum temperature at which glass attenuates.

12. Apparatus as in claim 11, further including a pair of opposing shields constructed and arranged to provide an open sided chamber defining the limits of said primary blast and means to cool the opposing surfaces of said shields so that the surfaces are at a temperature below which said glass fibers stick to said surfaces on engagement therewith but not so cool as to cause the main body of glass fibers carried by said primary blast between said shields to cool below a minimum temperature needed for attenuation while said fibers are between said shields.

13. Apparatus as in claim 12, further including a second pair of opposed shields spaced downstream from said first pair, said previously named bank of thin tubes being located in the space between said pairs of opposed shields and a second bank comprising a transversely extending row of closely spaced, thin tubes located downstream of said second pair of opposed shields to one side only of and extending essentially normal to said primary blast.

14. Apparatus as in claim 13, wherein said second pair of shields is spaced apart at a greater distance than the separation between said first pair of shields.

15. Apparatus as in claim 11, wherein said bank of tubes is constructed and arranged for each tube to deliver a mixture of fuel and oxidant.

16. Apparatus as in claim 11, wherein said row of said bank of tubes is constructed and arranged to have alternate adjacent tubes deliver fuel and oxidant.

17. Apparatus as in claim 11, further including at least one additional transversely extending row of said thin tubes spaced downstream of said first named row and disposed to one side only of said primary blast, said thin tubes of said additional row extending essentially normal to said primary blast.

18. Apparatus as in claim 17, wherein said thin tubes of said first named row and said thin tubes of said at least one additional row are located on the same side of said primary blast, said thin tubes being constructed and arranged to provide means for directing thin jets into the same side of said primary blast at stations spaced downstream from one another and from said glass introducing means.

19. Apparatus as in claim 17, wherein said thin tubes of said first named row are located on one side only of said primary blast and said thin tubes of said at least one additional row are located on the other side only of said primary blast, said thin tubes being constructed and arranged to provide means for directing a first line of thin jets into one side only of said primary blast at a first station spaced downstream of said glass introducing means and for directing a second line of thin jets into an opposite side only of said primary blast at a second station spaced downstream from said first station.

20. Apparatus as in claim 11, wherein said means for producing said primary blast is constructed and arranged to supply said primary blast at a temperature above 2800 degrees Fahrenheit at a speed of 400 to 800 feet per second through an opening at least 4 inches wide and ¼ to ¾ inches high and said means to deliver said jets comprises a bank of thin hollow tubes comprising a first row of closely spaced, thin, hollow tubes on one side only of said primary blast at a minimum distance of 6 inches from said primary fiber introducing means where the primary blast is above the minimum temperature required for glass attenuation, said tubes having inner diameters of 0.010 to 0.020 inch and being spaced at 0.060(n) inches where (n) is an integer from 1 to 2 along said rows, a second set of closely spaced thin tubes downstream of said first row to deliver spaced rows of thin, closely spaced, high speed jets into one side only of said primary blast at a velocity of at least 1000 feet per second and a total mass less than the total mass of said primary blast.

* * * * *